United States Patent [19]
Pelczyk et al.

[11] 4,353,050
[45] Oct. 5, 1982

[54] DISPLACEMENT MEASURING TRANSDUCER

[75] Inventors: Alan Pelczyk, Hockenheim, Fed. Rep. of Germany; Robert F. Purssell, Plymouth, England; Alfred J. Woollard, Hurst, Tex.; Albert L. Fowler, Kirkcaldy, Scotland; David M. Walker, Glenrothes, Scotland; Alan G. Henderson, Markinch, Scotland; Alastair K. Stevenson, Glenrothes, Scotland

[73] Assignee: Ranco Incorporated, Dublin, Ohio

[21] Appl. No.: 159,291

[22] Filed: Jun. 13, 1980

[51] Int. Cl.³ .............................................. H01F 21/02
[52] U.S. Cl. ....................................... 336/30; 336/75; 336/87
[58] Field of Search .................... 73/728, 722; 336/30, 336/75, 77, 79, 84 R, 84 C, 87, 134, 135, 132

[56] References Cited

U.S. PATENT DOCUMENTS 2,976,495  3/1961  Unger .............................. 336/84 C
3,471,844 10/1969  Schugt ................................. 336/87

*Primary Examiner*—Thomas J. Kozma
*Attorney, Agent, or Firm*—Watts, Hoffmann, Fisher & Heinke Co.

[57] ABSTRACT

A displacement-measuring transducer has a laminar member displaceable, for example under control of a vacuum actuator, within a housing containing respective pairs of coils spaced part in the displacement direction of the laminar member, which is provided with two apertures spaced apart in the said direction, such that the coupling between the coils of each pair is dependent upon the position of said apertures and, therefore, on the displacement of the laminar member.

15 Claims, 3 Drawing Figures

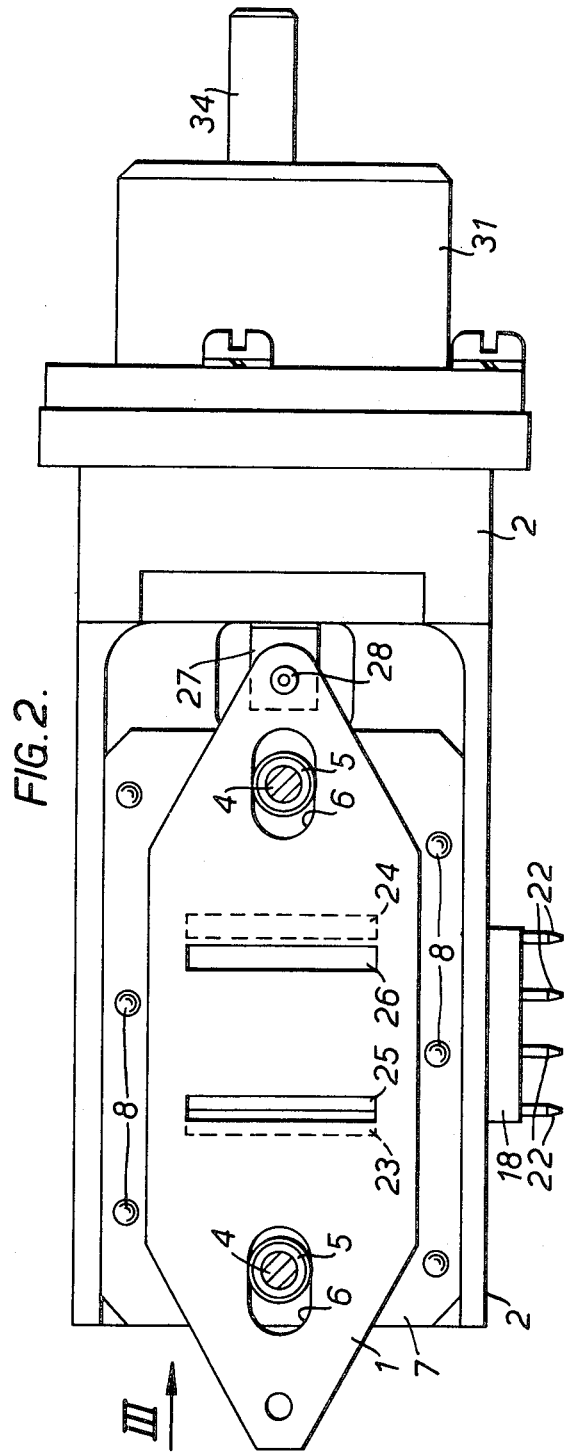

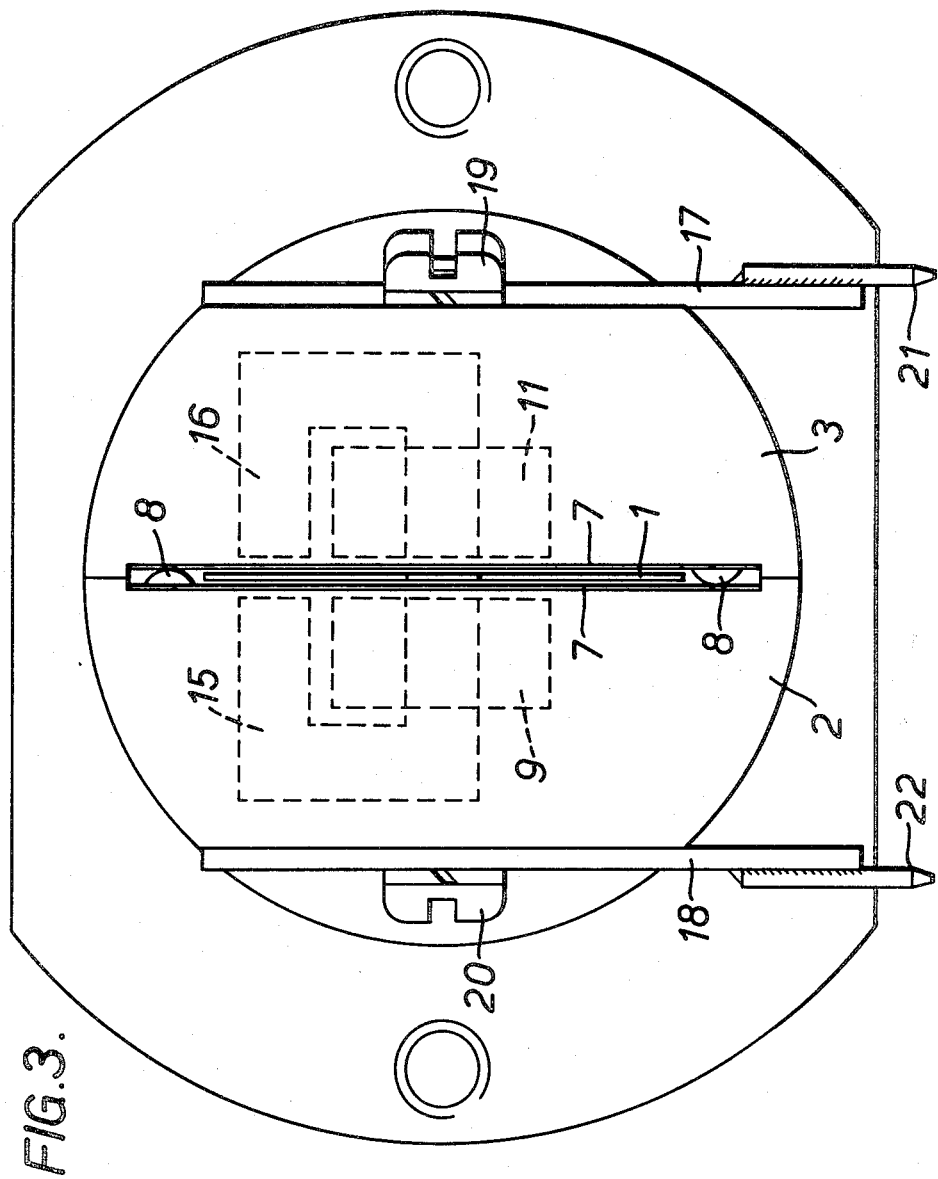

DISPLACEMENT MEASURING TRANSDUCER

This invention relates to a displacement measuring transducer, with particular, but not exclusive, reference to the measurement of displacements of a pressure response device so as to derive from the displacements an analogue electrical signal.

A displacement measuring transducer is known in which a digital displacement signal is derived electronically by measuring photoelectrically the displacement of a laminar member which is subjected to the displacement to be measured, the laminar member having a slot which upon displacement of the member moves between two light sources and a photoelectric pick-up device.

An object of the present invention is to provide an improved displacement measuring transducer which can be used for the derivation of displacement signals electromagnetically.

According to the invention there is provided a displacement measuring transducer comprising a laminar member displaceable in a housing and having two apertures spaced apart in the direction of displacement of the member, the apertures cooperating with at least two electromagnetic pick-up devices spaced apart in the said direction and shielded from each other so that upon displacement of the laminar member the displacement of the two apertures relative to the respective pick-up devices with which they cooperate results in respective electrical outputs from the pick-up devices which can be utilized to provide a measurement of the displacement of the laminar member relative to the housing.

By arranging that the spacing between the two apertures in the displaceable laminar member is different from the spacing between the electromagnetic pick-up devices cooperating with these apertures it is possible to derive from the pick-up devices an electrical signal, which may be in digital form, representative uniquely of the displacement of the laminar member relative to the housing.

In a preferred embodiment of the invention the outputs of the electromagnetic pick-up devices vary in response to variation in an electromagnetic coupling between a cooperating pair of coils by virtue of the displacement of the laminar member. In this embodiment each of the two pick-up devices comprises a pair of coils the coupling between which is determined by the position relative to the coils in the cooperating aperture in the displaceable member, the displaceable member in this case being electrically conductive, for example in the form of a metal strip or ribbon. The metal strip or ribbon is preferably mounted for sliding movement within a metal sleeve acting as an electromagnetic shield and having apertures therein at the positions of the respective pick-up devices with which the apertures in the displaceable strip or ribbon cooperate upon displacement of the latter in the sleeve.

Preferably the apertures in the laminar member have a different spacing from the apertures in the sleeve, so that in one position of the laminar member one aperture in the laminar member is in register with a cooperating aperture in the shield, while in another position of the laminar member the other aperture in the laminar member is in register with its cooperating aperture in the shield. The electromagnetic coupling between the two coils of each pick-up device will be directly dependent upon the effective size of the opening in the electromagnetic shield interposed between the two coils, which in turn will be dependent upon the extent to which the respective aperture in the displaceable strip or ribbon is in register with the cooperating aperture in the shield.

The displacement measuring transducer according to the invention may be used for the measurement of a pressure including, for example, the degree of vacuum in the induction system of an internal combustion engine. For this purpose one end of the displaceable laminar member may be connected directly to a displaceable part of a pressure responsive device such as a diaphragm or piston. In one embodiment of the invention one end of the laminar member is connected to a central portion of a displaceable diaphragm the periphery of which is sealed within a chamber to which a pressure to be measured is applied. The chamber may house a compression spring which loads the central portion of the diaphragm with a biasing force so that when a sub-atmospheric pressure is applied to the chamber, the diaphragm adopts an equilibrium position which is dependent upon said pressure. The sub-atmospheric pressure may for example comprise the pressure in the induction manifold of an internal combustion engine.

The housing in which the displaceable laminar member is located may conveniently be formed in two parts which are secured together to define a slot in which the laminar member is freely displaceable, the slot extending longitudinally through the housing and being formed by two cooperating channels in the two parts of the housing. The two housing parts may be secured together by bolts, rivets or other securing elements which act as guides for the longitudinal displacement of the laminar member. Thus the securing elements preferably pass through longitudinally elongate holes in the laminar member so as to guide the latter in its longitudinal movement in the housing slot.

A practical embodiment of the invention as applied to a transducer for the measurement of vacuum in an internal combustion engine is illustrated, by way of example, in the drawings accompanying the provisional specification, in which:

FIG. 2 is a side elevation of the transducer shown in FIG. 1, with one housing half and one shield removed, and FIG. 3 is an end view in the direction of arrow III in FIG. 2.

Figure 1:
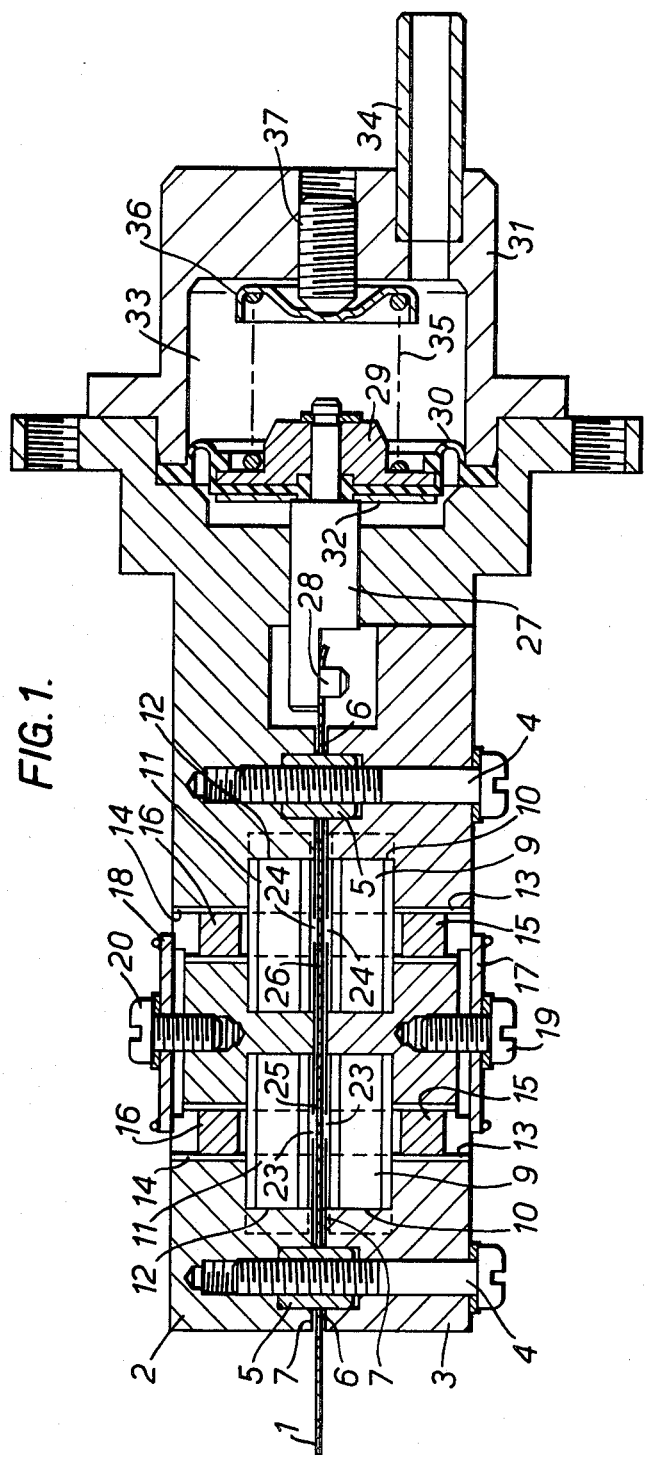
FIG. 1 is a diagrammatic longitudinal section through the transducer.

In the drawings, a displaceable laminar member in the form of a flat copper strip or slide 1 is displaceable in a longitudinally extending slot in a metal housing. The housing is formed in two halves, comprising a body 2 and a side cover 3 which have cooperating shallow longitudinally extending channels which together define a longitudinally extending slot in which the slide 1 is located. The side cover 3 is secured to the body 2 of the housing by two screws 4 which pass through respective longitudinally elongate holes 6 in the slide 1. The bushes 5 act as guides for the longitudinal displacement of the slide 1 in the housing.

The slide 1 is movable within a sleeve formed by two parallel electromagnetic shield plates 7, also of copper sheet, extending longitudinally within the slot of the housing and covering opposite respective faces of the slide 1. Each shield plate 7 is formed with a raised protuberance 8 (FIG. 3) which engages the other plate 7 and accurately predetermines the spacing between the shield plates 7 and, therefore, the width of the sleeve through which the laminar slide moves.

Two electromagnetic pick-up devices are disposed within the housing at positions which are spaced apart in the direction of movement of the slide 1. Each pick-up device comprises a pick-up coil 9 housed in a cavity 10 in the side cover 3 and cooperating with a respective drive coil 11 housed in a cavity 12 in the body 2 of the housing, the respective cavities 10, 12 of each pick-up device being aligned with each other on a common transverse axis perpendicular to the plane of the slide 1. Each cavity 10, 12 communicates with the exterior of the housing through a respective slot 13, 14. The coils 9 and 11 have respective U-shaped cores 15, 16, part of each of which is shown in FIG. 1, which define a closed magnetic flux path between the cooperating pairs of coils 9 and 11. The positions of two of the coils 9 and 11 and their cores 15 and 16 are indicated in broken outline in FIG. 3.

Electrical connections to the respective pairs of coils 9, 11 are made through contact carrying circuit boards 17, 18 respectively attached to opposite sides of the housing by self-tapping screws 19, 20 screwed into the side cover 3 and the body 2 respectively. The contact carrying boards 17, 18 carry respective electrical connections for the two associated coils 9, 11 respectively and are each provided with four contact pins 21, 22 (FIGS. 2 and 3) for connection to a respective socket connector (not shown). Each drive coil 10 is coupled electro-magnetically to its associated pick-up coil 11 through aligned windows 23, 24 in the two shields 7, the windows 23, 24 comprising transverse slots aligned with the common axis of each respective pair of coils 9, 11. The two slot-like windows 23, 24 in one of the shields 7 are shown diagrammatically in broken outline in FIG. 2. The distance between the centres of the two transverse slots 23, 24 in each shield 7 is, therefore, equal to the distance between the common axes of the two pairs of aligned coils 9, 11.

The slide 1 is formed with two apertures 25, 26 in the form of transversely extending slots of the same dimensions as the slots 23, 24. The apertures 25, 26 are spaced apart by a smaller distance than the slots 23, 24, as shown clearly in FIG. 2, such that when one of the slide apertures, say 25, is completely in register with the associated slots 23 of the shields 7 the other aperture, 26, is out of register with the associated slots 24. The extent of mis-registration or overlap between each aperture 25 and 26 and its associated slot 23, 24 will affect directly the degree of coupling between each drive coil 11 and its associated pick-up coil 9, so that for each position of the longitudinally displaceable slide 1 relative to the housing there will correspond different degrees of coupling between the coils 9 and 11 and, therefore, a different combination of signals from the two pick-up coils 9.

The displacement of the slide 1 is translated into an electrical signal proportional to the slide displacement derived from the two pick-up coils 9. The two drive coils 11 are fed with two alternating or pulse-form signals which are alternately in phase and in phase quadrature relative to each other during successive timed intervals timed by an associated clock pulse generator. The two pick-up coils 9 will detect the respective signals from the two drive coils, these signals being combined to provide a resultant signal the phase of which will be dependent upon the degree of coupling between the respective pick-up coils and their associated drive coils 11, which in turn will be dependent directly upon the position of the slide 1, as explained above. The phase angle of the resultant signal derived by combination of the detected signals from the two pick-up coils 9 will therefore be an analogue representation of the displacement of the slide 1 relative to the housing.

The electrical circuit for providing the drive signals for the two drive coils 11 and for combining the detected signals from the two pick-up coils 9 does not form part of the present invention and may be of any convenient type. A suitable circuit is described in U.K. patent specification No. 1481166.

In the application of the transducer illustrated in the drawings the displacement of the slide 1 measured by the transducer is in turn representative of a pressure to be measured, in this case the pressure or "vacuum" existing in the induction system of an internal combustion engine. The end of the slide 1 within the housing is connected to a longitudinally displaceable rod 27 by a transverse pin 28 attached to one end of the rod 27 and passing through a hole in the adjacent end of the slide 1. The rod 27 is secured to a boss 29 clamped to a central portion of a flexible diaphragm 30, the outer periphery of which is clamped sealingly between one end of the housing body 2 and an end cover 31. The central portion of the diaphragm 30 is clamped flat between the boss 29 and a flat plate 32 abutting one end of the rod 27. The diaphragm 30 forms one wall of a chamber 33 within the end cover 31. The pressure to be measured is applied to the chamber 33, in this case by connecting a pipe 34 communicating with the interior of the end cover 31 with part of the conductive system of an internal combustion engine, so that the pressure in the chamber 33 is substantially equal to that in the engine induction system.

A helical compression spring 35 is located within the chamber 33 and bears at one end against the boss 29 and at its other end against a cup 36 supported within the chamber 33 by a calibration screw 37 screwed into an end wall of the cover 31. By adjusting the position of the screw 37, which is a sealing fit in the end cover 31, the axial position of the rod 27 and of the slide 1 in the rest condition of the transducer can be determined. The comprssion range of the spring 35 is such that for variations within the range to be measured of the pressure in the engine induction system, applied to the chamber 33 through the pipe 34, there will correspond a predetermined range of equilibrium positions of the diaphragm 30 and, therefore, of the rod 27 at which the pressure difference across the diaphragm 30 resulting from the drop in pressure or "vacuum" in the engine induction system is balanced by the compression of the spring 35. Thus the axial position of the rod 27, and, therefore, of the slide 1 in the housing will be directly dependent upon the sub-atmospheric pressure in the chamber 33.

To avoid any tendency for the edges of the apertures in the slide 1 and the shields 7 to interfere with each other, due for example to buckling of the slide, thin sheets of magnetically transparent low-friction material such as ∓Mylar" (Registered Trade Mark) may be interposed between the opposite faces of the slide 1 and each shield plate 7. Alternatively, or in addition, the apertures 25 and 26 in the slide 1, and/or the slots 23, 24 in the shields 7, may be filled with low-friction plastics material such as polytetrafluoroethylene which may also form thin protective coatings on the surfaces of the slide and/or the shields.

It will be appreciated that the transducer according to the invention can be used for other purposes than measuring pressure, as described above. For example, the transducer may be used to monitor a tension applied through a suitable coupling to the displceable slide 1 of the transducer.

We claim:

1. A displacement-measuring transducer comprising a linearly displaceable laminar member mounted for sliding movement within a metal sleeve located in a housing, the laminar member having two apertures spaced apart in the direction of displacement of the member, and at least two electromagnetic pick-up devices cooperating with said apertures and spaced apart in the said direction, the metal sleeve acting as an electromagnetic shield and having apertures therein at the positions of the respective pick-up devices, so that upon displacement of the laminar member the displacement of the two apertures of the laminar member relative to the respective pick-up devices with which they cooperate results in respective electrical outputs from the pick-up devices which can be utilized to provide a measurement of the displacement of the laminar member relative to the housing.

2. Transducer as claimed in claim 1, wherein each said pick-up device comprises a pair of coils the coupling between which is determined by the position relative to the coils of the cooperating aperture in the displaceable member.

3. Transducer as claimed in claim 1 or claim 2, wherein the displaceable laminar member comprises a metal strip or ribbon and further including a metal sleeve within which said strip or ribbon slides, said sleeve acting as an electromagnetic shield and having apertures therein at the positions of the respective pick-up devices with which the apertures in the displaceable strip or ribbon cooperate upon displacement of the latter in the sleeve.

4. Transducer as claimed in claim 3, wherein the apertures in the laminar member have a different spacing from the apertures in the sleeve.

5. Transducer as claimed in claim 1, wherein the displaceable laminar member is connected directly to a displaceable part of a pressure responsive device.

6. Transducer as claimed in claim 5, wherein the pressure responsive device includes a flexible diaphragm sealed peripherally in a chamber, one end of said laminar member being connected to a central portion of said diaphragm, a pressure to be measured being applied in use of the transducer to said chamber.

7. Transducer as claimed in claim 6, including a compression spring in said chamber which loads the central portion of the diaphragm with a biassing force so that when a sub-atmospheric pressure is applied to the chamber the diaphragm adopts an equilibrium position which is dependent upon said pressure.

8. Transducer as claimed in claim 1 wherein the housing is formed in two parts which are secured together to define a slot in which the laminar member is freely displaceable, the slot extending longitudinally through the housing and being formed by two cooperating channels in the two parts of the housing.

9. Transducer as claimed in claim 8, wherein the two housing parts are secured together by bolts, rivets or other securing elements which act as guides for the longitudinal displacement of the laminar member.

10. Transducer as claimed in claim 9, wherein the securing elements pass through longitudinally elongate holes in the laminar member so as to guide the latter in its longitudinal movement in the housing slot.

11. Transducer as claimed in claim 3, wherein the sleeve comprises two parallel shield plates each having at least one raised protuberance which contacts the other plate and defines the width of the sleeve in which the laminar member moves.

12. Transducer as claimed in claim 3 or claim 11, wherein sheets of magnetically transparent low-friction material are interposed between the opposite faces of the laminar member and the sleeve in which it slides.

13. Transducer as claimed in claim 1, wherein the apertures in the laminar member are filled with magnetically transparent plastics material.

14. Transducer as claimed in claim 3, wherein the apertures in the sleeve are filled with magnetically transparent plastics material.

15. Transducer as claimed in claim 13 or claim 14, wherein the plastics material filling said apertures also forms protective coatings on the facing surfaces of the laminar member and the sleeve.

* * * * *